(12) United States Patent
Van Gelderen

(10) Patent No.: US 8,486,949 B2
(45) Date of Patent: Jul. 16, 2013

(54) USE OF AZAPERONE FOR IMPROVING GROWTH PERFORMANCE

(75) Inventor: Rainier Johannes Hendrikus Van Gelderen, Reusel (NL)

(73) Assignee: Elanco Animal Health Ireland Limited, Sligo (IE)

( * ) Notice: Subject to any disclaimer, the term of this patent is extended or adjusted under 35 U.S.C. 154(b) by 11 days.

(21) Appl. No.: 13/119,733

(22) PCT Filed: Sep. 17, 2009

(86) PCT No.: PCT/EP2009/062040
§ 371 (c)(1), (2), (4) Date: Mar. 18, 2011

(87) PCT Pub. No.: WO2010/031805
PCT Pub. Date: Mar. 25, 2010

(65) Prior Publication Data
US 2011/0177196 A1 Jul. 21, 2011

(30) Foreign Application Priority Data
Sep. 18, 2008 (EP) ..................... 08164591

(51) Int. Cl.
*A61K 31/496* (2006.01)
(52) U.S. Cl.
USPC ........................... 514/253.01; 426/2; 544/360
(58) Field of Classification Search
USPC ........................ 514/253.01; 544/360; 426/2
See application file for complete search history.

(56) References Cited

U.S. PATENT DOCUMENTS 4,192,865 A * 3/1980 Helbig .......................... 424/677

OTHER PUBLICATIONS

Etherton et al, J. Animal Science 1987, p. 433-443) . Administration of Azaperone to swine, horses and ponies and dogs are known in the art.*
Drugs in livestock feed (NTIS order, PB-298450, 1978, pp. 1-69.*
Blackshaw, J.K., "The effect of pen design and the tranquilising drug, Azaperone, on the growth and behaviour of weaned pigs.", Australian Veterinary Journal, 1981, pp. 272-276, vol. 57(6).
Caccia et al., "Identification and quantitation of 1-arylpiperazines, metabolites resulting from side-chain cleavage of (4-substituted aryl-1-piperazinyl)aryl heterocyclic derivatives in rat plasma and brain." Journal of Chromatography, 1984, pp. 211-221, vol. 283, XP002501027.
Gonyou et al., "Effects of amperozide and azaperone on aggression and productivity of growing-finishing pigs.", Journal of Animal Science, Nov. 1, 1988, pp. 2856-2864, vol. 66(11), New York, NY,US, XP009107602.
Porter et al., "Azaperone: a review of a new neuroleptic agent for swine.", Veterinary Medicine, Jan. 1, 1985, pp. 88-92, vol. 80(3), Edwardsville, KS,US XP009107614.
International Search Report relating to International Patent Application No. PCT/EP2009/062040. Date of Mailing of International Search Report: Oct. 27, 2009.
Written Opinion of the International Searching Authority relating to International Patent Application No. PCT/EP2009/062040. Date of Mailing of Written Opinion: Oct. 27, 2009.
Marydale et al., "The Merck Index: Azaperone (898).", Merck Index: An Encyclopedia of Chemicals, Drugs and Biologicals, 2006 (14th edition), p. 151, Merck Station, NJ, US, XP002501028.

* cited by examiner

*Primary Examiner* — Savitha Rao
(74) *Attorney, Agent, or Firm* — James J. Sales

(57) ABSTRACT

The present invention relates to a method for improving growth performance in animals without causing sedation by orally administering azaperone in a low dose together with food or drinking water. Improving growth performance comprises the increase of growth rate over a certain period of time.

9 Claims, No Drawings

USE OF AZAPERONE FOR IMPROVING GROWTH PERFORMANCE

CROSS REFERENCE TO RELATED APPLICATIONS

This application is the U.S. national stage of Application No. PCT/EP2009/0562040, filed Sep. 17, 2009, which application claims priority from EP 08164591.3, filed Sep. 18, 2008.

The present invention relates to a method for improving growth performance in animals without causing sedation by orally administering azaperone in a low dose together with food or drinking water. Improving growth performance comprises the increase of growth rate or weight gain over a certain period of time.

Azaperone is a butyrophenone neuroleptic discovered in the early 1960s by Janssen Pharmaceutica laboratories and is currently available as the 4% sterile injectable solution called Stresnil™. Chemically, it is 4'-fluoro-4-(4-(2 pyridyl)-1-piperazinyl-butyrophenone and has the following structure:

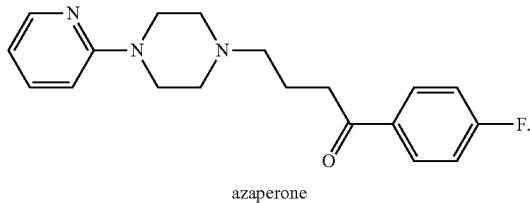 [SMILES: O=C(CCCN1CCN(c2ccccn2)CC1)c1ccc(F)cc1]

azaperone

Stresnil™ (azaperone) injection is indicated for the prevention of aggressive-ness and stress by inducing a variable degree of sedation. Following a single dose of Stresnil™, pigs may be mixed and fighting is eliminated or greatly reduced.

Stresnil™ injection is a potent sedative-tranquilizer which produces a predictable and consistent sedative response in pigs. The drug is fast acting, the onset of sedation is approximately 5 to 10 minutes after intramuscular injection. Within minutes after intramuscular administration, the animal becomes unsteady on its feet and lies down. The animal remains conscious but is quiet and indifferent to the environment. The degree of sedation is directly proportional to the amount of drug administered and the recommended dose of azaperone for the pig is 0.4 to 2 mg/kg of body weight.

As disclosed in *Veterinary Medicine*, 80, 3, 88-92 (1985) by Porter D. B. and Slusser C. A., it has been observed that intramuscular injection of azaperone to pigs also results in increased weight gain. On the other hand, Gonyou H. W. et al. report in *J. Anim. Sci.*, 66, 2856-2864 (1988) that intramuscular administration of azaperone to pigs did not had significant effect on weight gain, feed consumption of feed efficiency. Also Blackshaw J. K. reported in *Aust. Vet. J.*, 57: 272-276 (1981) that intramuscular injection of azaperone had no effect in promoting relative growth rate of pigs.

Caccia S. et al. disclose in *Journal of Chromatography*, 283, 211-221 (1984) the identification and quantitation of metabolites of azaperone using biological samples from rats that were given orally azaperone.

Improved growth performance such as improved weight gain is a desirable economic benefit to the livestock industry. However intramuscular injection of azaperone is cumbersome and time consuming since each animal has to be treated individually whereby the dosage has to be determined based on the weight of said animal. Moreover there is a trend in the pig industry to limit the number of intramuscular injections because of their negative impact on animal welfare. Furthermore sedation of the treated animal after intramuscular injection is not always of benefit and even undesirable when non aggressive animals are treated.

It has now been found that oral administration of azaperone in a low dose continuously provided together with food or drinking water is an easy method for improving growth performance such as increased weight gain or growth rate in animals without causing sedation. Moreover for treating a large number of animals the oral administration of azaperone by mixing it with food or drinking water is very convenient compared to intramuscular injection that has to be done individually.

The term "animals" refers to any non-human warm-blooded animals in particular those produced for consumption such as poultry (chickens, turkey, ducks, ostrich, emu, quail etc.), and ruminants (goats, sheep, and cattle), pigs and rabbits.

The term "growth performance" is known in the art as a reference to the criteria of growth rate of an animal. The "growth rate" or "weight gain" of an animal is the rate of unit gain in live weight of the animal. Growth rate or weight gain is obtained from successive measurements of live weight over a certain period of time. Accordingly, in the present invention the term "growth performance" means an improvement or increase in growth rate or weight gain over time of an animal.

In a first embodiment the present invention relates to a non-therapeutic method for improving growth performance of animals without causing sedation by administering azaperone characterized in that azaperone is continuously orally administered together with food or drinking water in a dose ranging from 0.5 mg/kg/day to 3.0 mg/kg/day.

Administration of azaperone through a water distribution system such as for providing drinking water is preferred. Many livestock farms are already equipped with the necessary devices to administer medication via drinking water hence no special modifications are needed to administer azaperone together with drinking water via the water distribution system. The dosing of azaperone can be adjusted in function of the water consumption of the livestock. For instance, piglets with a weight of 7 kg drink on average about 1.6 liter water per day. When azaperone is administered in a dose ranging from 0.5 mg per kg body weight per day to 3.0 mg per kg body weight per day this translates into a concentration of azaperone in the drinking water ranging from 2.2 to 13.1 mg per liter.

In a second embodiment the present invention relates to a non-therapeutic method for improving growth performance of animals without causing sedation by administering azaperone characterized in that azaperone is continuously orally administered together with drinking water in a concentration ranging from 2 mg to 13.0 mg per liter drinking water. In practice a concentration of about 6 mg azaperone per liter drinking water is typically used.

In a third embodiment the present invention relates to a non-therapeutic method for improving growth performance of animals without causing sedation by administering azaperone which method comprises the continuous oral administration of azaperone together with food or drinking water in a dose ranging from 0.5 mg/kg/day to 3.0 mg/kg/day during a period from one to six days, more particular during a period of three days.

In a fourth embodiment the present invention relates to a non-therapeutic method for improving growth performance of animals without causing sedation by administering azaperone which method comprises the continuous oral administration of azaperone together with drinking water in a concentration ranging from 2 mg to 13.0 mg per liter drinking water during a period from one to six days, more particular during a period of three days. In practice a concentration of about 6 mg azaperone per liter drinking water is typically used.

In a fifth embodiment the present invention relates to a non-therapeutic method for improving growth performance of animals without causing sedation by oral administration of azaperone wherein the improved growth performance of an animal is an increase of growth rate.

In another aspect the present invention relates to the use of azaperone for improving growth performance of animals without causing sedation wherein azaperone is continuously orally administered to said animal in a dose ranging from 0.5 mg/kg/day to 3.0 mg/kg/day. Azaperone can be administered orally mixed together with food or drinking water wherein the drinking water may be supplied through a drinking water supply system.

In a sixth embodiment the invention relates to the use of azaperone for improving growth performance of animals without causing sedation wherein azaperone is continuously orally administered to said animal in a concentration ranging from 2 mg to 13.0 mg per liter drinking water. In practice a concentration of about 6 mg azaperone per liter drinking water is typically used.

For administration with food, azaperone can be formulated in the form of a complete feed, a concentrate that is added to a feed product, a pre-mix that may be mixed with a feed product, or as a product which can be applied or spread on top of a feed composition. Such formulations of azaperone suitable for administration with food can be made using art-known techniques.

For administration with drinking water or through a water supply system, azaperone is formulated in the form of a suitable concentrated water dilutable solution. An example of such a formulation is e.g.:
Formula 1: (100 mg/ml):

| | |
|---|---|
| Azaperone | 100 mg |
| Citric acid | 80 mg |
| Methyl parahydroxybenzoate | 2 mg |
| Propyl parahydroxybenzoate | 0.2 mg |
| Purified water q.s. | 1 ml |

The effectiveness of orally administered azaperone through a drinking water system to increase weight gain in weanling pigs is demonstrated in the following example.
Preclinical Study of the Effects of Azaperone Administered Via Drinking Water The study was performed in weaned pigs to investigate the effect of azaperone that was continuously orally administered via drinking water on behaviour, feed conversion, growth and homogeneity of growth.

Groups of approximately 250 pigs were enrolled in the study starting from the moment they were weaned. The pigs were housed according to everyday farming conditions in a conventional pig farm. All pigs were housed in similar buildings. Each group was housed in 2 compartments, gilts and barrows were housed in separate compartments. Pigs were kept in pens of approximately 12 individuals each.

After weaning, the piglets were housed in continuous artificial light for the first 48 hours. Afterwards, pigs were housed in continuous darkness for the further duration of the study, except during observations (twice a day). During the course of the study, pigs were not vaccinated. A metaphylactic colistine treatment via drinking water was applied in each group starting from the fifth day after weaning. Treatment continued for seven days.

Pigs were fed ad libitum. Troughs were filled automatically with a computerized system that records the supplied weight of feed per pen. During the first ten days of the nursery period, pigs were fed a pelleted weaner feed which had also been available to the piglets in the farrowing unit. Between the $10^{th}$ and $15^{th}$ day at the nursery, the weaner feed was gradually replaced by grower pellets which have been given until the $35^{th}$ day. Finally a switch was made between the $35^{th}$ and the $40^{th}$ day from grower pellets to starter pellets. Tap water was available during the whole period of the study and was supplied via a water nipple in the feeding trough.

The drinking water comprising azaperone was obtained by diluting Stresnil™ injection in water to obtain a concentration of 6 mg azaperone per liter drinking water. A primary dilution was prepared by diluting 90 ml of Stresnil™ 4% injectable solution with tap water to obtain 6 liters of preparation. This primary dilution was linked for 24 hours with an automatic dosing system which continuously diluted the preparation in the drinking water at a rate of 1 to 100. One preparation of the primary dilution was sufficient to treat 600 liters of drinking water which exceeded the anticipated daily consumed volume of water by the pigs in one compartment. The two following days, a new primary dilution was made fresh each morning and linked to the automatic dosing system for 24 hours.

This study was a controlled parallel study with 4 sequential groups of approximately 250 weaned pigs each. The first and third group were treated with azaperone via the drinking water for 3 consecutive days. The second and fourth group were control groups treated with placebo (plain drinking water). After the completion of these four groups, two additional groups (one treated with azaperone and one control group) were included in the study to investigate more in detail the effect of the azaperone treatment on the behaviour of the pigs. In each of these additional groups, 5 pens of approximately 12 pigs were enclosed.

TABLE 1

The following treatment groups can be distinguished:

| Group | Number of pigs | Number of pens | Treatment |
|---|---|---|---|
| 1 | 273 | 20 | placebo |
| 2 | 259 | 20 | azaperone |
| 3 | 255 | 20 | placebo |
| 4 | 240 | 20 | azaperone |
| 5 | 66 | 5 | azaperone |
| 6 | 63 | 5 | placebo |

On day one of the test period, water containing 6 mg azaperone per liter or placebo, was made available. Starting from the fourth day, the drinking water no longer contained azaperone. All pigs followed the normal procedures for further fattening. No pigs were brought to the slaughterhouse during the study (3 days dosing and 39 days follow-up).
Body Weight Per Pig Body weights were determined for all pigs in groups 1 to 4. The body weight of each individual animal was determined a first time at the start of the study, just before movement to the nursery and a second time at the end of the study, after a period of 42 days in the nursery.

The daily body weight gain value for each pig was calculated as follows:

$$\text{daily body weight gain(kg)}_i = \frac{\text{body weight(kg)}_i \left[\text{end of the study} - \text{weaning day}\right]}{\text{duration(days)}_i}$$

with $i$ = pig identification

Descriptive statistics for each group and a statistical comparison between the treated and control group by means of the Wilcoxon Mann-Whitney U test was performed on the individual daily body weight gain values.

During the course of the study, azaperone-treated animals gained 16.3±3.31 kg during the study whereas placebo-treated animals only gained 15.1±3.48 kg. This difference was found to be significant.

The homogeneity of growth for each group was expressed by the coefficient of variation. The coefficient of variation was calculated by dividing the standard deviation by the average. The homogeneity of initial and final body weights of placebo and azaperone-treated groups is represented in Table 2.

TABLE 2

Evolution of body weight and variation throughout the study in placebo and azaperone-treated groups

| treatment | Initial BW kg | CoV* | Final BW kg | CoV | body weight gain kg | CoV |
|---|---|---|---|---|---|---|
| placebo | 6.48 | 24% | 21.58 | 20% | 15.11 | 23% |
| azaperone | 7.21 | 26% | 23.62 | 18% | 16.34 | 20% |

*CoV: coefficient of variation = standard deviation/mean

The coefficient of variation indicates the importance of the variation observed in the group. The higher this coefficient is, the lower the homogeneity there is in that group. The results in Table 2 show that homogeneity was slightly lower in the placebo-treated group when it was entered in to the study. At the end of the study however, homogeneity was found to be better in the azaperone-treated group than it was in the placebo-treated group.

Behaviour of the Animals Per Pen

In order to assess the effect of the azaperone treatment on the behaviour of the animals after weaning, the occurrence of hierarchical fights was followed in groups 1 to 4 and recorded by the Principal Investigator during a period of 1 week after weaning. Every day a behaviour score of 0 to 2 was given to each pen:

0=sedated (reduced reactivity)
1=calm (no aggression, social acceptance)
2=aggression (hierarchical fights, fresh skin lesions in a number of pigs)

In groups 1 to 4, behaviour of the pigs was always scored as normal although hierarchical fighting was reported on the farm. This indicated that the method of scoring the behaviour as described in the original protocol, was not sufficiently sensitive. Therefore groups 5 and 6 were included in the study to follow the pig's behaviour more closely. These two additional groups (one treated with azaperone and one control group) were closely monitored for behavioural changes. During the first 7 hours after weaning and movement to the nurseries, the occurrence and severity of hierarchical fights, the number of pigs laying down, and the number of pigs eating or drinking, was recorded. The same parameters were monitored during a two-hours-period on the third day of treatment (from 48 to 50 hours after initiation of the treatment). Observations were done during a period of 2 minutes and repeated in each pen every 10 minutes. The observations were done by the Study Monitor. The number of pigs laying down, the number of pigs eating or drinking and the number of pigs engaging in hierarchical fights, were counted, the severity of hierarchical fights was judged by using a numerical scale:

1=modest fighting (1 contact)
2=moderate fighting (short fight with biting and/or scratching)
3=severe fighting (prolonged fighting with severe biting and/or scratching).

When comparing the behaviour of pigs in groups 5 and 6, there was found to be no difference in the number of pigs lying down or eating during the first 7 hours after initiation of azaperone or placebo treatment (first 7 hours after grouping).

Conclusion: in this study it was observed that azaperone, when administered to weaned pigs via the drinking water at a dose of 6 mg/liter water during the first three days of a 42 day test period, resulted in an additional increase of 1.2 kg of body weight or 8% compared to the placebo-group obtained during the complete test period. Also the azaperone treated groups had a more homogenous body weight distribution at the end of the testing period. Finally the behaviour testing indicated there was no difference in the number of pigs lying down or eating after initiation of azaperone or placebo treatment which is indicative for the absence of a sedative effect.

The invention claimed is:

1. A non-therapeutic method for improving growth performance of animals without causing sedation the method comprising continuous oral administration of azaperone together with food or drinking water to said animal in a dose ranging from 0.5 mg/kg/day to 3.0 mg/kg/day, wherein the animal is a pig.

2. The method as claimed in claim 1 wherein azaperone is administered through a drinking water supply system.

3. The method as claimed in claim 2 wherein azaperone is administered in a concentration ranging from 2 mg to 13.0 mg per liter drinking water.

4. The method as claimed in claim 3 wherein azaperone is administered in a concentration of 6 mg per liter drinking water.

5. The method according to claim 1 wherein azaperone is administered during a period from one to six days.

6. The method as claimed in claim 5 wherein azaperone is administered during a period of three days.

7. The method according to claim 1 wherein the improved growth performance of an animal is an increase of growth rate.

8. The method according to claim 1 wherein azaperone is administered with food.

9. The method according to claim 8 wherein azaperone is formulated in a form selected from the group consisting of a complete feed, a concentrate added to a feed product, a premix optionally mixed with a feed product, and a product optionally applied or spread on top of a feed composition.

* * * * *